United States Patent
Savant

(10) Patent No.: US 7,834,500 B2
(45) Date of Patent: Nov. 16, 2010

(54) LUBRICATION ARRANGEMENT FOR A GENERATOR SYSTEM

(75) Inventor: Satish Dattatraya Savant, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 12/230,527

(22) Filed: Aug. 29, 2008

(65) Prior Publication Data

US 2010/0052442 A1 Mar. 4, 2010

(51) Int. Cl.
*H02K 7/10* (2006.01)
*H02K 1/16* (2006.01)
*H02K 9/197* (2006.01)

(52) U.S. Cl. .................. 310/78; 310/61; 310/75 R; 310/83; 310/99; 290/31; 290/36 R; 192/56.6; 464/46; 464/47; 464/48; 74/333; 74/640

(58) Field of Classification Search ........... 310/78, 310/52, 53, 54, 57, 58, 61, 75 R; 290/31, 290/36 R; 192/56.6; 464/46, 47, 48; 74/333, 74/640, 731.1, 467, 468; 475/159, 160; *H02K 9/08, H02K 9/10, 9/12, 9/197, 5/12, 51/00, 7/10, H02K 1/16*
See application file for complete search history.

(56) References Cited

U.S. PATENT DOCUMENTS

| | | | |
|---|---|---|---|
| 2,696,585 A | 12/1954 | Vermillion | |
| 2,864,017 A * | 12/1958 | Waltscheff | 310/126 |
| 3,283,191 A | 11/1966 | Carruth | |
| 3,366,869 A | 1/1968 | Young | |
| 3,626,223 A | 12/1971 | Maier | |
| 6,864,604 B2 * | 3/2005 | Nakano et al. | 310/57 |
| 6,903,471 B2 * | 6/2005 | Arimitsu et al. | 310/59 |
| 7,282,826 B2 * | 10/2007 | Langenberg et al. | 310/83 |
| 2003/0107280 A1 * | 6/2003 | Hasegawa et al. | 310/90 |

OTHER PUBLICATIONS

Algrain, U.S. Appl. No. 12/000,842, filed Dec. 18, 2007 (19 pages).
Guven et al., U.S. Appl. No. 12/149,345, filed Apr. 30, 2008 (19 pages).
Savant et al., U.S. Appl. No. 11/704,814, filed Feb. 9, 2007 (24 pages).
Savant et al., U.S. Appl. No. 11/830,278, filed Jul. 30, 2007 (20 pages).

* cited by examiner

*Primary Examiner*—Quyen Leung
*Assistant Examiner*—Michael Andrews
(74) *Attorney, Agent, or Firm*—Finnegan, Henderson, Farabow, Garrett & Dunner LLC

(57) ABSTRACT

A generator system is disclosed. The generator system includes an input gear, a gear train coupled to the input gear, and a clutch associated with the input gear, wherein the clutch is exposed to the gear train.

20 Claims, 3 Drawing Sheets

LUBRICATION ARRANGEMENT FOR A GENERATOR SYSTEM

TECHNICAL FIELD

The present disclosure is directed to a generator system, and more particularly, a lubrication arrangement for a generator system.

BACKGROUND

Many electrical generators, such as induction generators, are associated with a mechanical energy source, such as wind turbines, internal combustion engines, or any other device capable of producing mechanical movement, to convert at least a portion of the mechanical movement to electric energy.

Electric generators may include a rotor shaft rotatably coupled to the mechanical energy source and associated with a rotor assembly. The rotor assembly may include a rotor that rotates relative to a stator around a rotor rotation axis. The stator may include stator conductors and the rotor may include-rotor conductors. The mechanical energy source may rotate the rotor shaft which may drive the rotor relative to the stator, electrically exciting the rotor conductors to generate magnetic flux. Such electrical generators may use the magnetic flux to transfer power between the stator and the rotor, producing voltage in the stator conductors. The voltage in the stator conductors may be used to provide current for powering electrical devices and/or stored for future use.

Electrical generators may include components configured to transmit the rotational movement from the mechanical energy source to the rotor shaft. Engine-driven induction generators, for example, couple the rotational movement of an engine crankshaft to the rotor shaft of the generator. A flywheel may be coupled to the engine crankshaft via an input gear, such as a crankgear, and may transfer the rotational movement of the crankshaft to a clutch coupled to the flywheel. The rotational movement may be transmitted from the clutch to a gear arrangement coupled to the clutch, which in turn may be transmitted to the rotor shaft of a generator.

A gear train may also be coupled to the crankgear and configured to transmit lubrication oil to components of the generator by driving a lubrication oil supply, such as a oil steering pump, oil implement pump, and/or a powertrain oil scavenge pump. However, the typical configuration of the induction generator may not allow for efficient lubrication of all of the generator components. For example, lubrication oil supplied to the gear train may be blocked by the flywheel and by any resultant windage as the flywheel rotates, preventing adequate amounts of lubrication oil from reaching the clutch and gear arrangement. Furthermore, because lubrication oil may be blocked or dammed by the flywheel, excess lubrication oil may accumulate around the flywheel, and as the flywheel rotates, the lubrication oil may be churned, resulting in aeration and churning losses which contribute to inefficiencies of the generator system.

One attempt to improve the lubrication arrangement of a generator system may include removing the flywheel. An example of such a generator system is described in U.S. Pat. No. 2,864,017 (the '017 patent) to Waltscheff, issued on Dec. 9, 1958. The '017 patent describes an induction motor including a stator supported on a motor housing, an intermediate rotor, and a squirrel cage rotor keyed to a rotor shaft and configured to rotate relative the intermediate rotor and the stator. A series of gears coupled together by an overrunning clutch is coupled to the rotor shaft and transfers torque to the intermediate rotor.

Although the generator system of the '017 patent may expose some components to lubrication oil, it may have limitations. For example, the configuration of the gears and the overrunning clutch may block lubrication oil from reaching the clutch, which may prevent adequate lubrication of the clutch and increase the potential for wear.

The generator system of the present disclosure is directed towards improvements to the existing technology.

SUMMARY OF THE DISCLOSURE

One aspect of the present disclosure is directed to a generator system. The generator system may include an input gear, a gear train coupled to the input gear, and a clutch associated with the input gear, wherein the clutch is exposed to the gear train.

Another aspect of the present disclosure is directed to a generator system including an input gear, a gear train coupled to the input gear, a clutch associated with the input gear, a rotor shaft coupled to the clutch, a rotor coupled to the rotor shaft, and a stator located adjacent the rotor, the input gear, the gear train, and the clutch sealed from the rotor and the stator.

DETAILED DESCRIPTION

Figure 1:
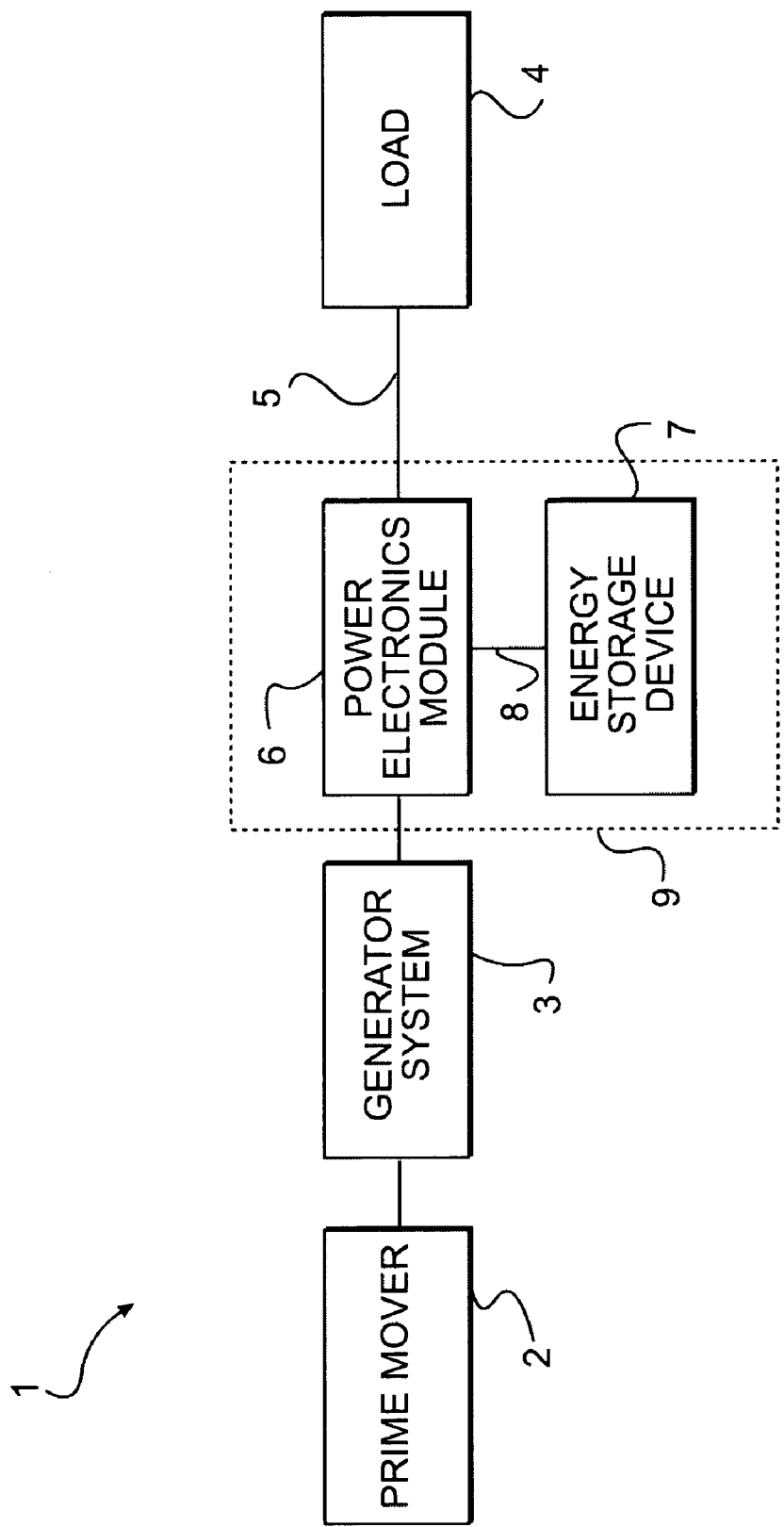
FIG. 1 is a schematic illustration of an electrical system according to an exemplary disclosed embodiment.

An exemplary electrical system 1 is shown in FIG. 1. Electrical system 1 may include a prime mover 2 configured to provide mechanical energy, a generator system 3 associated with prime mover 2 and configured to receive the mechanical energy, at least one load 4, and an electrical connection 5 configured to electrically couple generator system 3 to load 4.

Prime mover 2 may include any suitable main power source configured to supply generator system 3 with mechanical energy. For example, prime mover 2 may include a turbine engine, internal combustion engine, or any other device capable of producing mechanical power. In one exemplary embodiment, prime mover 2 may be a gasoline or diesel-powered internal combustion engine having multiple subsystems that cooperate to produce a mechanical energy output, wherein an engine crankshaft may rotatable couple the engine to generator system 3 and deliver the mechanical energy output.

As will be explained in more detail below, generator system 3 may be any type of device configured to receive mechanical energy from prime mover 2, and then convert at least a portion of the mechanical energy into electrical energy. For example, generator system 3 may be an induction generator, a variable-frequency alternating current generator, a fixed-frequency alternating current generator, a permanent-magnet generator, a switched-reluctance generator, or any other generator. In one embodiment, generator system 3 may be an alternating current induction generator.

Electrical system 1 may also include a power electronics module 6, such as any suitable electronic device, configured convert, condition, supply, and/or regulate the production, absorption, and/or flow of electrical energy in electrical system 1. An energy storage device 7 may also be associated with electrical system 1 and may be any device configured to use electrical energy to store energy such as, for example, a battery, an inductor, and/or capacitor. Power electronics module 6 may be coupled to energy storage device 7 via one or more electrical conductors 8 and may receive electrical energy from energy storage device 7. Together, power electronics module 6 and energy storage device 7 may act as an uninterruptible power source 9.

Load 4 may include one or more devices connected to and drawing electrical current from generator system 3 to perform some type of task. Load 4 may include, for example, electrical equipment, lights, motors, heating elements, electronic circuitry, refrigeration devices, air conditioning units, computer servers, and the like. In one exemplary embodiment, load 4 may include one or more systems and/or devices that utilize uninterrupted electrical power from uninterruptible power source 9 to perform one or more time sensitive tasks. Electrical connection 5 may include any type of electrical connector or electrical connection system that is capable of electrically coupling load 4 to generator system 3 and uninterruptible power source 9.

Figure 2:
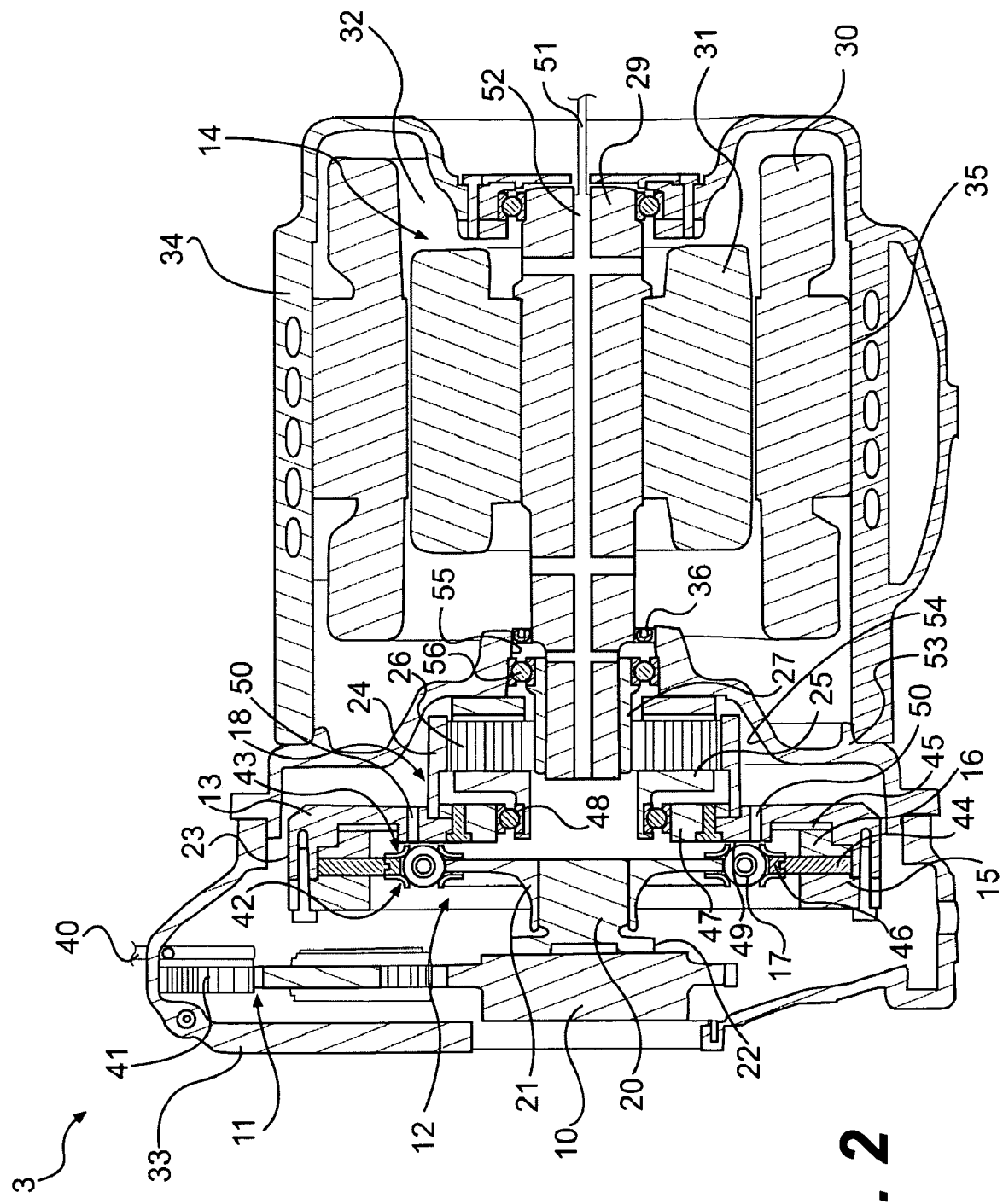
FIG. 2 is a diagrammatic illustration of a generator system according to an exemplary disclosed embodiment.

FIG. 2 illustrates an exemplary embodiment of generator system 3. Generator system 3 may include an input gear 10, a gear train 11 coupled to the input gear 10, a clutch 12 associated with input gear 10 and exposed to gear train 11, and an adapter plate 13 configured to couple clutch 12 to a rotor assembly 14. Although not shown in FIG. 2, it should be appreciated that input gear 10 may be rotatably coupled to any type of prime mover 2 known in the art. For example, input gear 10 may be a crankgear engaged with a crankshaft of an internal combustion engine.

Clutch 12 may include a reaction plate 15, a friction plate 44, a biaser 45, a pressure plate 16, and a spring coupling 46. Clutch 12 may be rotatably coupled to input gear 10 via a hub 20 coupled to a hub adapter 21 of clutch 12. Hub 20 may be configured to transfer mechanical energy from prime mover 2 (shown in FIG. 1) via input gear 10 to clutch 12. Hub 20 may be engaged with input gear 10 and may mate with hub adapter 21 of clutch 12. For example, an outer surface area of hub 20 and an inner surface area of hub adapter 21 may include male and female splines configured to mesh with each other.

Hub adapter 21 may be engaged to spring coupling 46, and friction plate 44 may be coupled to spring coupling 46 in any suitable manner. Friction plate 44 may also be positioned between reaction plate 15 and pressure plate 16. Spring coupling 46 may include a plurality of springs 17 configured to permit oscillatory torsional compliance between prime mover 2 and rotor assembly 14. Biaser 45 may provide an axial spring force to bias reaction plate 15 into engagement with friction plate 44. Once friction plate 44 is rotated beyond a predetermined torque, friction plate 44 may slip relative to reaction plate 15 and pressure plate 16, for example, as a response to excess, amplified torque induced by resonant vibrations. A frictional force engaging friction plate 44 with reaction plate 15 may be overcome and may cause friction plate 44 to slip relative to reaction plate 15 and pressure plate 16, thereby inhibiting the transmission of torque to pressure plate 16 and adapter plate 13.

The adapter plate 13 may be rotatably coupled to clutch 12 and further associated with a planetary gear arrangement 18, wherein planetary gear arrangement 18 may include a ring gear 24, a planet carrier 25 having at least one connected planet gear 26, and a sun gear 27. Adapter plate 13 may act as an energy storage mechanism configured to transmit rotational energy to planetary gear arrangement 18. For example, adapter plate 13 may be coupled to an outer diameter 23 of reaction plate 15 and rotatably coupled to a rotating element 47. Rotating element 47 may be coupled to ring gear 24, for example, via a splined engagement, and configured to rotatably drive ring gear 24. A bearing 48 may be positioned between rotating element 47 and planet carrier 25 to permit rotating element 47 to drive the rotation of ring gear 24 while rotating about planet carrier 25. Ring gear 24 and planet gear 26 may be rotatably coupled and planet gear 26 may be rotatably coupled with sun gear 27. Sun gear 27, planet gear 26, and ring gear 24 may all rotate together simultaneously. Adaptor plate 13 may include, for example, a clutch housing or a clutch cover, and may be configured to partially house clutch 12 from planetary gear arrangement 18. It is also contemplated that adaptor plate 13 may include a flywheel.

Gear train 11 may be rotatably engaged with input gear 10. An oil supply 40 may be configured to supply lubrication oil to gear train 11. A system of gears 41 associated with gear train 11 may be rotatably driven by input gear 10 and the lubrication oil fed to gear train 11 may be splashed and transmitted to clutch 12 due to the rotation of the gears 41. An unrestricted path between gear train 11 and clutch 12 exposes clutch 12 to gear train 11 and may allow the lubrication oil to effectively contact and lubricate clutch 12. Clutch 12 may include a first face 42 and a second face 43, wherein first face 42 may be proximate input gear 10 and exposed to gear train 11. The lubrication oil supplied from gear train 11 may contact first face 42. To further accommodate an unrestricted path between gear train 11 and clutch 12, hub 20 may include an outer diameter 22 which is substantially smaller than an outer diameter 23 of clutch 12 so as to expose clutch 12 to lubrication oil delivered from gear train 11.

The unrestricted path from gear train 11 to clutch 12 may facilitate an effective distribution of lubrication oil to first face 42 of clutch 12. Lubrication of clutch 12 components may include hub adapter 21, spring coupling 46, springs 17, friction plate 44, and reaction plate 15. In addition, as clutch 12 rotates, the lubrication oil may spread and disperse to components of clutch 12 and other elements of generator system 3 associated with second face 43 of clutch 12, such as pressure plate 16, biaser 45, adaptor plate 13, and planetary gear arrangement 18. For example, the lubrication oil may seep through springs 17 of spring coupling 46 and/or through apertures positioned along spring coupling 46, friction plate 44, and/or hub adapter 21 to lubricate components adjacent second face 43 of clutch 12, such as a planetary gear arrangement 18.

Figure 3:
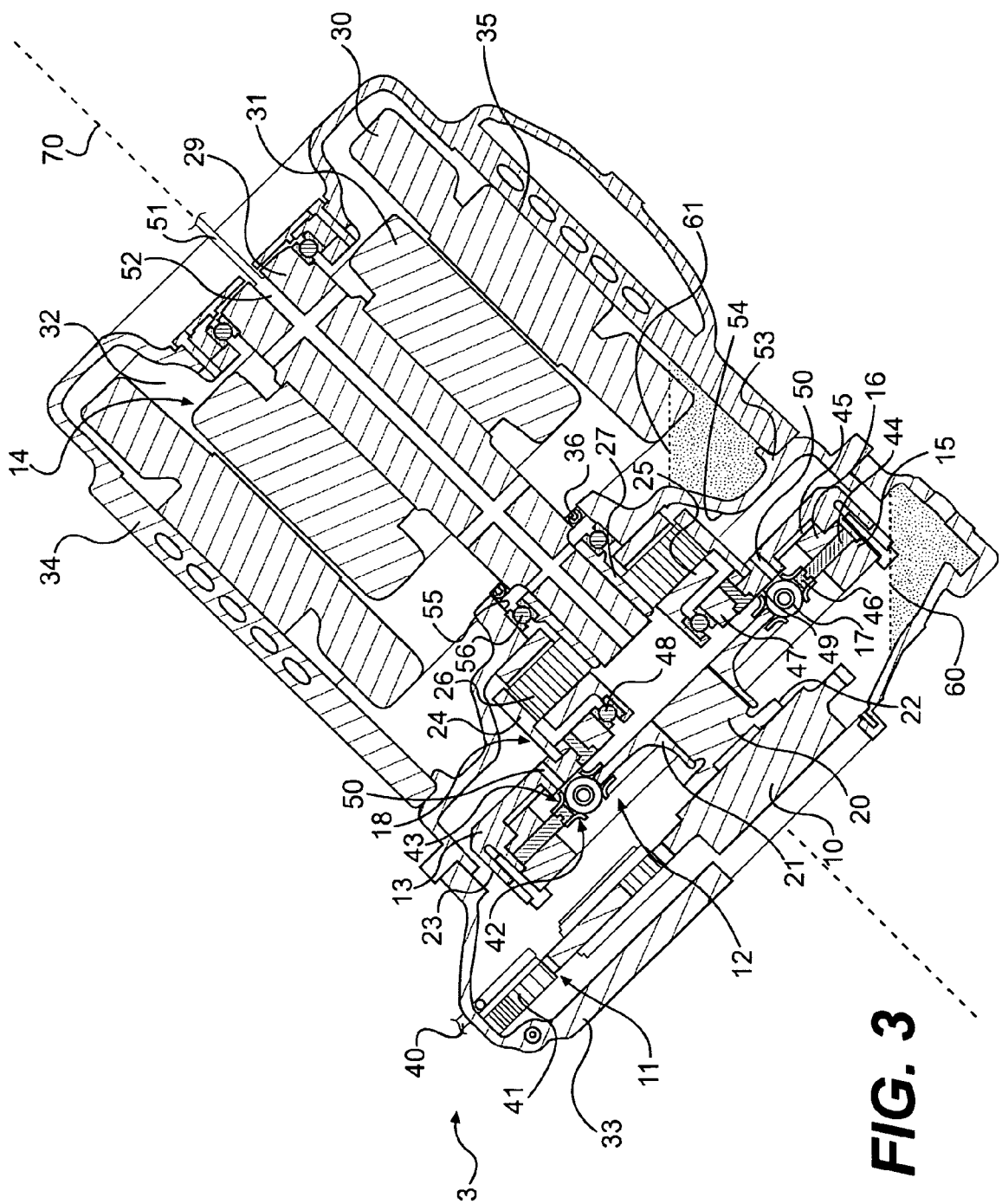
FIG. 3 is a diagrammatic illustration of the generator system of FIG. 2 in a tilted position according to an exemplary disclosed embodiment.

Adaptor plate 13 may also facilitate lubrication of planetary gear arrangement 18. For example, as shown in FIG. 2 and FIG. 3, lubrication oil transmitted through clutch 12 may be diverted by adaptor plate 13 towards planetary gear arrangement 18. Lubrication oil may reach an inner wall 49 of adaptor plate 13 and may be urged towards planetary gear arrangement 18 by gravity and/or the rotation of adaptor plate 13. Lubrication oil may then disperse and contact planet carrier 25, planet gears 26, ring gear 24, sun gear 27, and a rotor shaft 29 of rotor assembly 14. Alternatively or additionally, adaptor plate 13 may include distribution passages 50 configured to permit lubrication oil through adaptor plate 13 and to planetary gear arrangement 18.

Planetary gear arrangement 18 may provide a speed multiplication of the rotational energy of adaptor plate 13 delivered from prime mover 2 and deliver a reduced torque to rotor shaft 29 of rotor assembly 14. Sun gear 27 may be rotatably coupled to rotor assembly 14 via rotor shaft 29. Sun gear 27 may also be supported by a bearing 56. Generator system 3 may further include a stator 30 and a rotor 31. Rotor 31 forms part of rotor assembly 14 and may include a disk coupled to rotor shaft 29. Due to the coupling, rotation of rotor shaft 29 by prime mover 2 may cause rotation of rotor 31. Rotor 31 may include one or more turns of an electrical conductor wound in the form of a coil. Rotor 31 may include several such windings that may be spatially displaced from each other, each of which may constitute an individual phase of a polyphase winding. The polyphase winding may be composed of copper or any other suitable electrical conductor.

Stator 30 may include a stationary disk. Thus, rotor 31 may rotate relative to stator 30 whenever prime mover 2 rotates rotor shaft 29. Stator 30 may include a central passage 32 through which rotor shaft 29 and rotor 31 may pass. It is contemplated that the surface defined by central passage 32 may be free from contact with rotor shaft 29. Stator 30 may further include one or more turns of an electrical conductor wound in the form of a coil. Stator 30 may include several such windings that may be spatially displaced from each other, and each of which may constitute an individual phase of a polyphase winding. The windings may be composed of copper or any other suitable electrical conductor.

Generator system 3 may further include a first compartment 33 configured to house input gear 10, gear train 11, clutch 12, adaptor plate 13, and planetary gear arrangement 18. A second compartment 34 separate from first compartment 33 may be configured to house rotor assembly 14 and stator 30, wherein stator 30 may be mounted on an inner surface 35 of second compartment 34. An oil supply 51 may be associated with rotor shaft 29 and may provide lubrication oil to rotor assembly 14. For example, and as shown in FIG. 2 and FIG. 3, oil supply 51 may direct lubrication oil through lubrication channels 52 of rotor shaft 29. As rotor shaft 29 rotates, lubrication oil delivered to channels 52 may direct and distribute lubrication oil to components of rotor assembly and stator 30. Channels 52 may extend to planetary gear arrangement 18 to provide further lubrication for planetary gear arrangement 18 and clutch 12. Although not shown in FIGS. 2 and 3, it is contemplated that channels 52 may extend up to but not beyond sealing member 36. In such a configuration, different types of oil may be supplied via oil supplies 40 and 51 and separately contained within first compartment 33 and second compartment 34. For example, transmission oil may be supplied via oil supply 40 and maintained in first compartment 33, while a cooling oil may be supplied via oil supply 51 and maintained in second compartment 34. Alternatively or additionally, oil supply 51 may be positioned along second compartment 34 to directly supply lubrication oil to rotor assembly 14. A wall 53 positioned between first compartment 33 and second compartment 34 may be configured to separate first and second compartment 33, 34. Wall 53 may include a recess 54 configured to receive planetary gear arrangement 18. A portion of rotor shaft 29 may be received through an aperture 55 of wall 53 and engage planetary gear arrangement 18 within recess 54.

First compartment 33 and second compartment 34 may be fluidly sealed from each other via a sealing member 36. Sealing member 36 may be, but not limited to, for example, a lip seal. Sealing member 36 may be positioned within aperture 55 of wall 53 of and may surround a portion of rotor shaft 29. Sealing member 36 may act as a fluid seal between first compartment 33 and second compartment 34, while also permitting rotation of rotor shaft 29.

Separate first compartment 33 and second compartment 34, wall 53, and sealing member 36 may maintain lubrication oil levels in generator system 3. For example, as shown in the exemplary embodiment of FIG. 3, generator system 3 may be tilted during use, for example, a nosedive position wherein a longitudinal axis 70 of generator system 3 may be angled between 0°-45°. A lubrication oil reservoir 61 within second compartment 34 may be blocked by sealing member 36 and wall 53 from entering and accumulating in first compartment 33. Blocking lubrication oil from second compartment 34 may prevent excess build up of a lubrication oil reservoir 60 within first compartment 33, while also maintaining lubrication oil levels within second compartment 34 for adequate component lubrication. Preventing excess accumulation and pooling of lubrication oil in first compartment 33 may reduce the potential of aeration of lubrication oil and excess heat generation. Clutch 12 and adaptor plate 13 may rotate with minimal contact with lubrication oil reservoir 60 of first compartment 33, thereby preventing air mixing and dissolving into the lubrication oil and the formation of foam. In addition, maintaining the level of lubrication oil reservoir 60 may prevent cavitation of the lubrication oil and component damage to generator system 3 as clutch 12 and adaptor plate 13 may rotate with minimal contact with lubrication oil reservoir 60. Likewise, the rotating components of second compartment 34 may rotate with minimal contact with lubrication oil reservoir 61, preventing aeration of lubrication oil, cavitation, and excess heat generation.

INDUSTRIAL APPLICABILITY

The disclosed generator system 3 may be applicable in almost any type of electrical system 1. For example, generator system 3 may be suitable for supplying electrical power for use in a power grid, a facility, and/or a machine. Configurations consistent with the disclosed embodiments may provide an effective way to supplement or replace electrical power while also providing adequate lubrication to the components of generator system 3.

Mechanical energy may be delivered to rotor assembly 14 of generator system 3, wherein generator system 3 is configured to convert at least a portion of the mechanical energy into electrical energy. Delivering mechanical energy to rotor assembly 14 may include transmitting a rotational energy from input gear 10 to adaptor plate 13 and transmitting the rotational energy from adaptor plate 13 to rotor assembly 14, wherein adaptor plate 13 may be coupled to rotor assembly 14 via planetary gear arrangement 18. Rotational energy may be, for example, kinetic energy due to the rotation of an object. For example, prime mover 2 may include a gasoline or diesel-powered engine, wherein an engine crankshaft (not shown) may rotatably couple the engine to generator system 3 and deliver the mechanical energy output. Input gear 10 may be coupled to the crankshaft and may rotate in concert with the crankshaft. As input gear 10 is rotatably driven by the crankshaft, rotational energy may be transmitted from input gear 10 through hub 20 rotatably coupled to hub adapter 21 and to clutch 12.

The rotational energy may be transmitted from clutch 12 to adaptor plate 13 coupled to outer diameter 23 of clutch 12. The rotational energy from adaptor plate 13 may be transmitted to planetary gear arrangement 18. Adaptor plate 13 may be rotatably coupled to ring gear 24 of planetary gear arrangement 18 and may drive the rotation of ring gear 24. Planet gears 26 may be driven by ring gear 24 and may subsequently drive sun gear 27. Sun gear 27 may be coupled to rotor shaft 29, thereby, transmitting the rotational energy from planetary gear arrangement 18 to rotor shaft 29. As mechanical energy is delivered to rotor assembly 14, lubrication oil emitted from gear train 11 may be readily provided to clutch 12, and lubrication oil levels of reservoirs 60, 61 may be maintained.

Lubrication oil may be effectively transmitted to clutch 12 and components associated with clutch 12 because of the configuration of generator system 3. For example, the unrestricted lubrication path between gear train 11 and clutch 12 allows adequate lubrication oil to directly reach and lubricate clutch 12. Therefore, poor lubrication of clutch 12 or a separate lubrication oil supply associated with clutch 12 may be avoided. Additionally, the configuration of generator system 3 may prevent excess lubrication oil buildup or loss in portions of generator system 3. By housing input gear 10, gear train 11, clutch 12, energy storage device 13, and planetary gear arrangement 18 within first compartment 33 and rotor assembly 14 and stator 30 within second compartment 34, lubrication oil reservoirs 60, 61 may be maintained. The fluid seal 36 between first compartment 33 and second compartment 34 may prevent lubrication oil from transferring between reservoirs 60, 61 and thus lubrication oil buildup or loss in first compartment 33 or second compartment 34. Maintaining lubrication oil levels between first compartment 33 and second compartment 34 may ultimately prevent churning, aeration, and cavitation of lubrication oil by rotating components of generator system 3, such as clutch 12 or adaptor plate 13, which may improve component life and the lubricating effectiveness of the lubricating oil. Furthermore, separate first compartment 33 and second compartment 34 may provide the ability to separately control the levels of lubrication oil reservoirs 60, 61. For example, the volume of lubrication oil reservoir 60 may be increased by providing more oil to first compartment 33 from oil supply 40. Because first compartment 33 and second compartment 34 may be fluidly sealed from each other, an increase in the volume of oil reservoir 60 may not alter the volume of oil reservoir 61.

It will be apparent to those skilled in the art that various modifications and variations can be made to the generator system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A generator system, comprising:
    an input gear configured to be coupled to a prime mover;
    a gear train coupled to the input gear and positioned proximate an oil inlet port, the oil inlet port being configured to direct lubrication oil to the gear train;
    a planetary gear train, separate from the input gear and the gear train, coupled to a rotor assembly of the generator system; and
    a clutch exposed to the gear train and selectively coupling the input gear and the planetary gear train, the clutch being positioned between the input gear and the planetary gear train and configured to decouple the input gear from the planetary gear train when a torque transmitted by the clutch exceeds a predetermined amount.

2. The generator system of claim 1, wherein the positioning of the clutch with respect to the gear train allows the lubrication oil to be splashed on the clutch from the gear train.

3. The generator system of claim 2, wherein lubrication oil is supplied to the gear train and from the gear train to the clutch.

4. The generator system of claim 3, wherein the clutch includes a first face and a second face, the first face facing the gear train and the second face facing the planetary gear train.

5. The generator system of claim 4, further including a rotor and a stator positioned in a second compartment that is sealed from the input gear, the gear train, and the clutch.

6. The generator system of claim 5, further including a first compartment configured to house the input gear, the gear train, the planetary gear train, and the clutch, the first compartment being sealed from the second compartment.

7. The generator system of claim 6, wherein the first compartment and the second compartment are configured such that lubrication oil does not flow between the first compartment and the second compartment.

8. The generator system of claim 7, further including a wall configured to separate the first compartment from the second compartment and a sealing member associated with the wall and configured to fluidly seal the first compartment from the second compartment.

9. The generator system of claim 1, wherein the planetary gear train includes a sun gear, a planet carrier, and a ring gear, the ring gear being coupled to the clutch and the sun gear being coupled to the rotor assembly.

10. The generator system of claim 1, wherein the input gear and the clutch are positioned such that there are no components between the input gear and the clutch that will restrict the lubrication oil from splashing on the clutch from the input gear.

11. The generator system of claim 1, wherein the clutch is spaced apart in an axial direction from the input gear and the planetary gear train.

12. The generator system of claim 1, wherein the predetermined amount of torque that decouples the input gear from the planetary gear train is a torque that occurs as a result of vibration.

13. A generator system, comprising:
    an input gear train configured to be coupled to a prime mover;
    a planetary gear train coupled to a rotor of the generator system; and
    a clutch selectively coupling the input gear train and the planetary gear train, the clutch being axially spaced apart from and positioned between the input gear train and the planetary gear train, the positioning of the input gear train and the clutch being such that there are no components between them that block oil that splashes from the input gear train to the clutch, the clutch being configured to decouple the input gear train from the planetary gear train when a torque transmitted by the clutch exceeds a predetermined amount.

14. The generator system of claim 13, wherein the predetermined amount of torque that decouples the input gear from the planetary gear train is a torque that occurs as a result of vibration.

15. The generator system of claim 13, further including a stator, wherein the input gear train, clutch, and the planetary gear train are positioned in a first compartment and the rotor and the stator are positioned in a second compartment that is separate from the first compartment.

16. The generator system of claim 15, wherein the first compartment is configured to be fluidly sealed from the second compartment.

17. A generator system, comprising:
    a first compartment including,
        an input gear train, the input gear train configured to be coupled to a prime mover and lubricated by lubrication oil from an oil inlet port;
        a planetary gear train coupled to a rotor of the generator system; and
        a clutch positioned between the input gear train and the planetary gear train to expose the clutch to the input gear train, the clutch selectively coupling the input gear train and the planetary gear train, wherein the clutch is configured to decouple the input gear train from the planetary gear train when a torque transmitted by the clutch exceeds a predetermined amount;
    a second compartment spaced apart from the first compartment, the second compartment and including a stator circumferentially positioned around the rotor; and
    a sealing member between the first compartment and the second compartment that prevents lubrication oil flow therethrough.

18. The generator system of claim 17, wherein the positioning of the clutch with respect to the input gear train allows lubrication oil to be directly splashed on the clutch from the input gear train.

19. The generator system of claim 17, wherein the input gear train and the clutch are positioned such that there are no components between them that will block lubrication oil from splashing on the clutch from the input gear.

20. The generator system of claim 17, wherein the input gear train, the clutch, and the planetary gear train are axially spaced apart and aligned along a common axis.

* * * * *